United States Patent [19]

DiPierro, Jr. et al.

[11] Patent Number: 5,768,359

[45] Date of Patent: Jun. 16, 1998

[54] TELEPHONE CALL NOTIFICATION FEATURE

[75] Inventors: Anthony R. DiPierro, Jr., Long Valley; James J. Tupino, Hazlet, both of N.J.

[73] Assignee: Lucent Technologies Inc., Murray Hill, N.J.

[21] Appl. No.: 341,288

[22] Filed: Nov. 17, 1994

Related U.S. Application Data

[63] Continuation of Ser. No. 114,529, Sep. 1, 1993, abandoned.

[51] Int. Cl.$^6$ .............. H04M 3/42; H04M 1/64; H04M 1/56; H04M 15/06
[52] U.S. Cl. .............. 379/209; 379/88; 379/127; 379/142; 379/207; 379/216; 379/246; 379/355
[58] Field of Search .............. 379/67, 88, 89, 379/142, 209, 211, 212, 213, 245, 210, 214, 355, 216, 127, 246

[56] References Cited

U.S. PATENT DOCUMENTS

| | | | |
|---|---|---|---|
| 3,415,954 | 12/1968 | Kandel et al. | 379/209 |
| 4,166,929 | 9/1979 | Sheinbein | 379/209 |
| 4,476,349 | 10/1984 | Cottrell | 379/214 |
| 4,567,323 | 1/1986 | Lottes et al. | 379/201 |
| 4,661,975 | 4/1987 | Brecher | 379/211 |
| 4,800,583 | 1/1989 | Theis | 379/266 |
| 4,873,719 | 10/1989 | Reese | 379/142 |
| 4,893,325 | 1/1990 | Pankonen | 379/142 |
| 4,930,152 | 5/1990 | Miller | 379/214 |
| 4,932,042 | 6/1990 | Baral et al. | 379/245 |
| 4,939,771 | 7/1990 | Brown | 379/214 |
| 4,941,167 | 7/1990 | Cannalte et al. | 379/67 |
| 4,942,598 | 7/1990 | Davis | 379/142 |
| 4,975,944 | 12/1990 | Cho | 379/209 |
| 5,007,076 | 4/1991 | Blakley | 379/67 |
| 5,029,196 | 7/1991 | Morganstein | 379/210 |
| 5,063,588 | 11/1991 | Patsiokas | 379/142 |
| 5,113,429 | 5/1992 | Morley | 379/88 |
| 5,153,905 | 10/1992 | Bergeron et al. | 379/88 |
| 5,155,761 | 10/1992 | Hammond | 379/214 |
| 5,181,236 | 1/1993 | Lavalle | 379/216 |
| 5,185,782 | 2/1993 | Srinivasan | 379/216 |
| 5,245,651 | 9/1993 | Takashima | 379/142 |
| 5,247,568 | 9/1993 | Bergsman | 379/88 |
| 5,249,221 | 9/1993 | Ketring | 379/214 |
| 5,263,084 | 11/1993 | Chaput | 379/142 |
| 5,268,957 | 12/1993 | Albrecht | 379/209 |
| 5,276,731 | 1/1994 | Arbel | 379/88 |
| 5,282,243 | 1/1994 | Dabbaghi | 379/142 |
| 5,303,301 | 4/1994 | Takahata | 379/142 |
| 5,313,516 | 5/1994 | Afshar et al. | 379/67 |
| 5,361,295 | 11/1994 | Solomon et al. | 379/196 |
| 5,425,091 | 6/1995 | Josephs | 379/209 |

FOREIGN PATENT DOCUMENTS

| | | | |
|---|---|---|---|
| 0480233 | 4/1992 | European Pat. Off. | 379/209 |
| 0285052 | 11/1988 | Japan | 379/142 |
| 0284151 | 11/1989 | Japan | 379/142 |

Primary Examiner—Harry S. Hong
Attorney, Agent, or Firm—Frederick B. Luludis

[57] ABSTRACT

A facility is disposed in a telecommunications network to provide an alternative to the conventional call waiting feature. More particularly, if a telephone call is placed to a subscriber while the subscriber's telephone station set is busy with another telephone call, then the facility notes that fact and terminates the new telephone call after advising the caller that the subscriber's station is busy. Thereafter, the facility places a telephone call to the subscriber and presents thereto at least the telephone numbers of the telephone stations that placed respective calls to the subscriber during the time that the latter's station was busy.

11 Claims, 5 Drawing Sheets

TELEPHONE CALL NOTIFICATION FEATURE

This application is a continuation of application Ser. No. 08/114,529, filed on Sep. 1, 1993, now abandoned.

FIELD OF THE INVENTION

The invention relates to telecommunications networks.

BACKGROUND OF THE INVENTION

Call waiting is a call terminating feature which provides a distinctive tone to alert a subscriber who is "busy" talking over the telephone to another party that another call is trying to reach the subscriber. At that point, the subscriber may either ignore the tone or press the telephone station set switch hook. The latter action places the party that the subscriber is talking to on hold and connects the new incoming call to the subscriber's station set. Thereafter, the subscriber may once again press the switch hook to reconnect to the party that had been placed on hold. This time the latter action disconnects the subscriber's station set from the new call and reconnects it to the party that had been placed on hold.

We have recognized that many telephone subscribers are annoyed at hearing the call waiting tone while they are busy talking on the telephone. In fact, up to one-third of the telephone subscribers, at one time or another, ignore the call waiting tone. Moreover, the party that is talking to the subscriber may become irritated as a result of being placed on hold.

SUMMARY OF THE INVENTION

The present invention is directed to providing an alternative to the conventional call waiting feature. Specifically, in accordance with the invention, if a caller places a call to a subscriber's telephone station set that is busy with another call, then the new call is terminated, and thereafter, a telephone call is placed to the subscriber for the purpose of announcing those telephone calls that tried to reach the subscriber while the latter was busy with the other call. In accordance with an aspect of the invention, the caller is advised of the busy condition prior to such termination and the caller's telephone number is stored in memory so that it can be included in the announcement that is presented to the subscriber.

DETAILED DESCRIPTION

Figure 1:
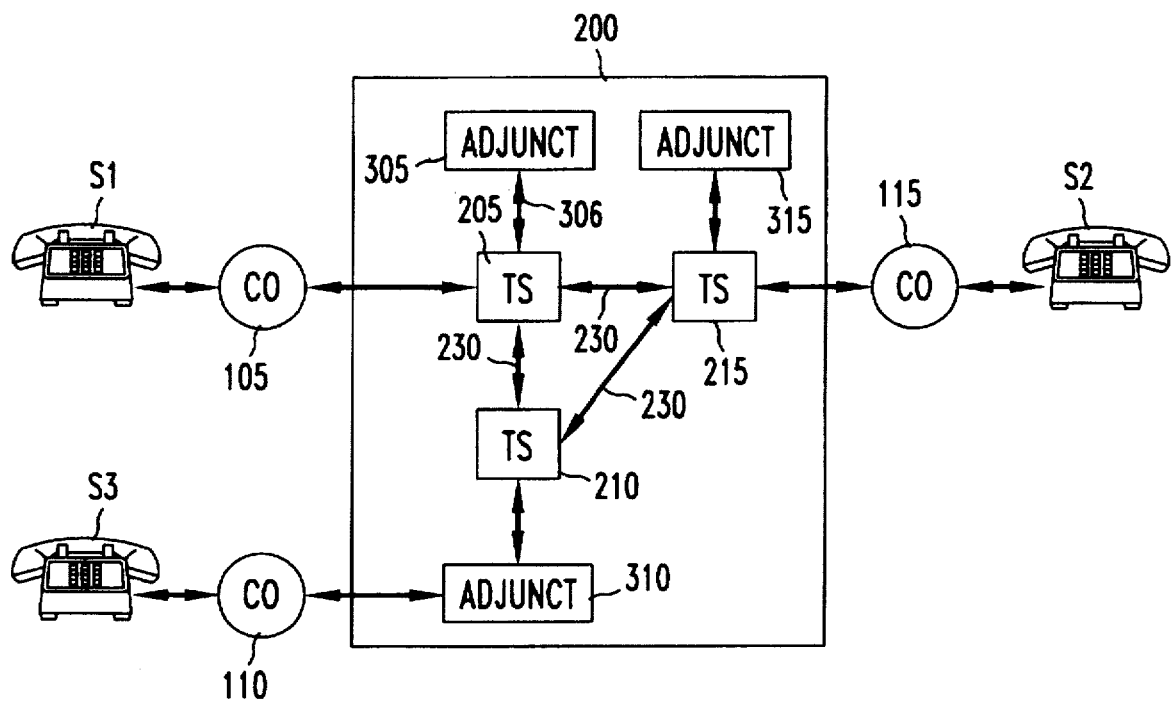
FIG. 1 is a broad block diagram of a telecommunications network in which the principles of the invention may be practiced.

In an illustrative embodiment of the invention, interexchange network 200, shown in FIG. 1, provides a plurality of services for its subscribers, such as the subscribers associated with station sets S1 through S3. Specifically, network 200 includes, inter alia, a plurality of interconnected Toll Switches (TS), three of which are shown in the FIG., namely TS 205, 210 and 215. Such toll switches (e.g., 205, 210 and 215) may be any one of the well-known types of switching equipments, such as, for example, the No. 4 ESS (Electronic Switching System) that is available from AT&T. In a typical case, a toll switch is associated with a number of local Central Offices (CO), three of which are shown in the FIG., namely, COs 105, 110 and 115. As is well-known, a CO, e.g., CO 105, is arranged to connect a calling station (originator) that has dialed a particular telephone number to an associated toll switch, e.g., TS 205. In doing so, the CO sends associated calling information including, inter alia, the dialed (called) telephone number and telephone number of the calling station to the toll switch. A CO is also arranged to advance a telephone call received from its associated toll switch to an intended telephone station set, e.g., station set S1.

It is seen from the FIG. that each toll switch, e.g., TS 205, may also be associated with an adjunct, e.g., adjunct 305. In an illustrative embodiment of the invention, an adjunct includes a voice interactive system, e.g., the well-known Conversant (trademark of AT&T) voice interactive system available from AT&T. An adjunct also includes a database system for the storage of subscriber records. A subscriber record identifies an associated subscriber's subscription of network 200 services. One such service may be an alternative to the conventional call waiting feature, in which the alternative is processed by an adjunct in accord with an aspect of the invention. (It is noted that adjuncts 310 and 315 associated with toll switches TS 210 and 215, respectively, are similar to adjunct 305. Accordingly, a discussion of adjunct 305 equally pertains to the other adjuncts).

Specifically, assume that the telephone user associated with station S2 places a telephone call to station S1 in a conventional manner. CO 115, responsive thereto, forwards the call and associated calling information (e.g., the calling and called telephone numbers) to TS 215. TS 215, in turn and in a conventional manner, determines that the destination toll switch for the call is TS 205 and forwards the call thereto. Upon receipt of the call, TS 205, in accord with an aspect of the invention, accesses a called destination table using a translation of the called telephone number as an index to the table. If TS 205 finds that the called telephone number is stored at the accessed location, then TS 205 concludes that the called subscriber is associated with one or more telephone services provided by network 200. In that case, then, TS 205 sends the called information to adjunct 305 via communications path 306. If the called number is not stored at the accessed location, then TS 205 processes the call in a conventional manner. That is, TS 205 forwards the call directly to CO 105 for routing to station S 1.

In an illustrative embodiment of the invention, communications path 306 may be, for example, a conventional ISDN Primary rate interface comprising 23 B channels for establishing telephone connections between adjunct 305 and TS 205. Communications path 306 also includes a D channel for exchanging signaling messages between TS 205 and adjunct 305. Adjunct 305, responsive to receipt of the aforementioned calling information via the associated D channel, supplies the called telephone number to an associated database to obtain a copy of a record identifying the various network 200 services associated with the called telephone number. Assuming that the called subscriber subscribes to the inventive service and that subscription is noted in the associated record, then adjunct 305 places a telephone call to the called number. Adjunct 305 does this by sending a call set-up (connect) message containing the called number to TS 205 via the aforementioned D channel. The message also contains the identity of the B channel that should be used to extend the call connection from TS 205 to adjunct 305. TS 205, responsive to the message, establishes a conventional call connection to CO 105 and forwards the call thereto. CO 105, in turn, extends the connection to station S1 and applies a conventional ringing signal thereto. CO 105 then sends a message to that effect to TS 205. Upon receipt of the message, TS 205 passes it to the originator of the call, namely adjunct 305, via the aforementioned D channel. Adjunct 305, responsive to receipt of the message, directs TS 205 to merge the newly established connection with the connection extending to the station S2 calling party. Accordingly, when the station S1 user answers the call, then the calling and called parties may communicate with one another.

Assume at this point that while the station S1 user is communicating with the station S2 user, the user associated with station S3 places a telephone call to station S1. Similarly, CO 110 forwards the call to TS 210, which, in turn, forwards the station S3 call to TS 205 via intertoll network 230. Upon receipt of the call and as mentioned above, TS 205 accesses its associated called destination table to determine if the called number is contained therein. Since it has been assumed that is the case, then TS 205 supplies the associated calling information to adjunct 305 in the manner described above. Similarly, adjunct 305, upon finding that the called subscriber subscribes to the inventive service, places a call to the called station, as described above. However, in this instance, CO 105 will be unable to forward the call to station S1, since that station is busy with a call received from station S2. Accordingly, CO 105 returns a signaling message indicating that the called station is busy to TS 205. TS 205, in turn, advises adjunct 305 of that fact via the aforementioned D signaling channel. Responsive to receipt of the station S1 busy message, adjunct 305 sends a call connect signaling message via the D channel requesting that the station S3 call connection be forwarded to adjunct 305. TS 205, responsive to receipt of the message, extends the station S3 call connection to adjunct 305 via an available B channel of path 306. In addition, TS 205 sends a message identifying the latter B channel via the associated D channel to adjunct 305.

At that point, adjunct 305 stores in its associated database the calling party telephone number and the current date and time. Adjunct 305 then transmits an announcement to station S3 indicating that the called station is busy and that the called subscriber will be notified of the calling party's call. The following is one example of such an announcement:

"This is the network 200 'While You Were Busy'Service. The party you have dialed is busy. We (1) will notify the party of the date and time you called and your telephone number within the next __minutes." (In the above example, any appropriate value, e.g., the value of 10, may be substituted for the underlining.)

Following the transmission of announcement 1, adjunct 305 sends, via the D channel of path 306, a disconnect message to TS 205 directing the latter to terminate the incoming call from station S3 and the call from adjunct 305 to station S1. TS 205, responsive to receipt of the message, terminates the call in a conventional manner.

Thereafter, when the above-mentioned time, e.g., 10 minutes, has elapsed, adjunct 305 places a call to station S1 in the manner described above. When the station S1 subscriber answers the call, adjunct 305, in accord with an aspect of the invention, transmits an announcement identifying the telephone numbers and times that associated telephone calls were placed to station S1 while that station was busy. It is noted that such telephone numbers may be announced in the same order that their associated calls were placed to station S1. The following is one example of such an announcement:

"This is the network 200 'While You Were Busy" service. While you were busy you received a telephone call from the following telephone numbers.

One - telephone number 908-606-8888 at 2:45 P.M. (2) on__; Two - telephone number 212-555-1234 at 2:53 P.M. on__; Three - telephone number 908-221-4444 at 3:06 P.M. on__;

If you would like to place a telephone call to any one of those numbers, enter the associated identifying digit.

(It is noted that the above underlining represents the date of the associated call.) Following the above announcement, adjunct 305 deletes the announced telephone numbers and associated times from its database, but stores a copy thereof in a so-called archive memory. The telephone numbers are archived in the event that the subscriber elects to review those announced numbers at a later time. If, in response to the announcement, the subscriber enters a digit, e.g., the digit two, then adjunct 305 sends a call connect message via the D channel of path 306 directing TS 205 to establish a call to the telephone number of 212-555-1234 and to merge that call with the call placed to station S1. TS 205, in response thereto, establishes the requested call and merges the call with the station S1 call in a conventional manner.

Figure 2:
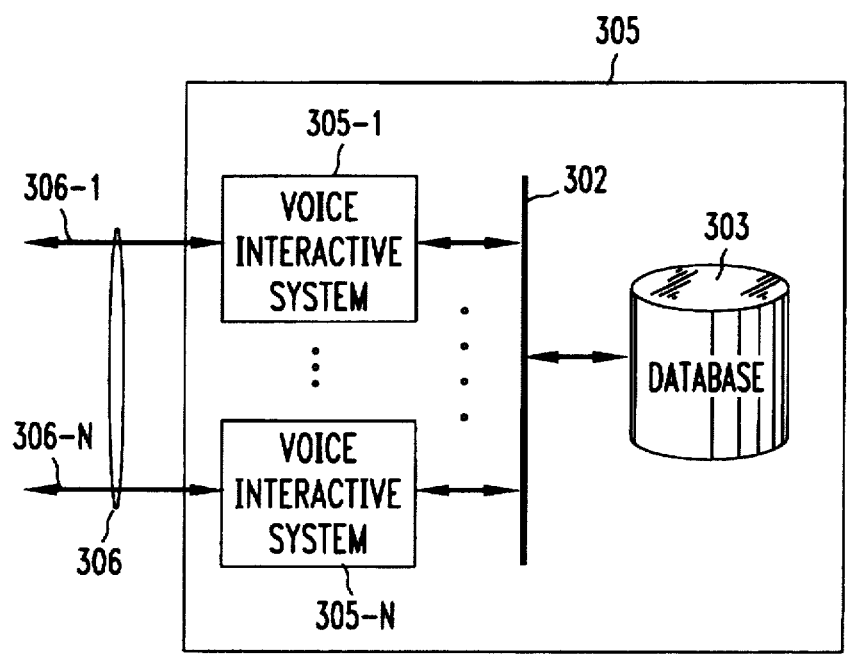
FIG. 2 is a broad block diagram of an adjunct of FIG. 1.
Figure 3:
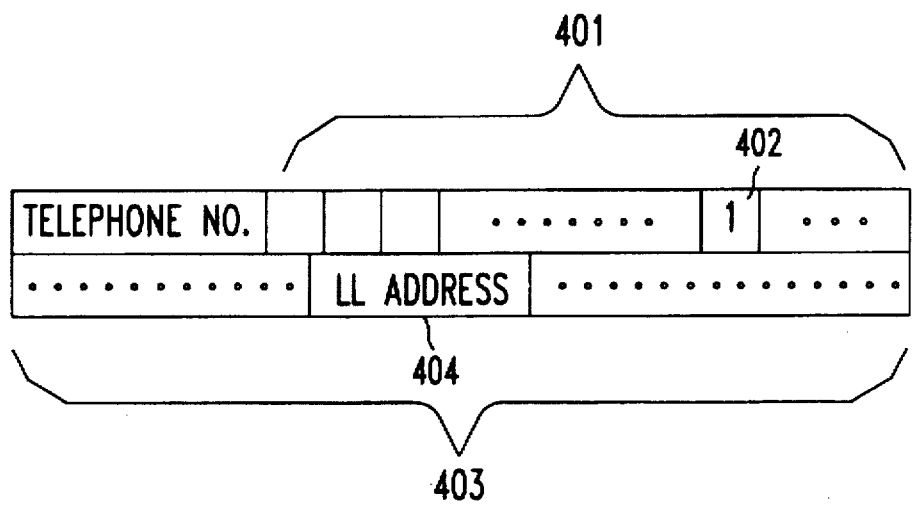
FIG. 3 is an illustrative example of a subscriber record that is stored in memory associated with an adjunct.

Turning now to FIG. 2, there is shown a broad block diagram of an adjunct, e.g., adjunct 305. An adjunct, more particularly, includes one or more voice interactive systems 305-1 through 305-N based on the level of traffic that it processes. It also includes a local area network 302, which interfaces the voice interactive systems with database 303. As mentioned above, database 303 is used for the storage of subscriber records and records associated with the various services forming the subscriber's subscription of services. An example of a subscriber record is shown in FIG. 3, in which a service record includes the subscriber's telephone number and a number of fields 401 identifying the subscriber's subscription of services. For example, if the subscriber subscribes to a number of different network 200 services, then associated ones of fields 401 contain a particular value, e.g., a binary one. If the subscriber does not subscribe to a particular one of the services, then its associated field 401 contains a different value, e.g., a zero. For example, assuming that field 402 is associated with the inventive service, then that field of the subscriber's associated record contains a one. Fields 403, on the other hand, are associated with respective ones of the different services. For example, field 404-associated with field 402-is used to store the first address of a Linked List (LL) of memory locations, each containing a telephone number of a calling party that tried to place a call to the associated subscriber while the subscriber was busy with another call.

Figure 4:
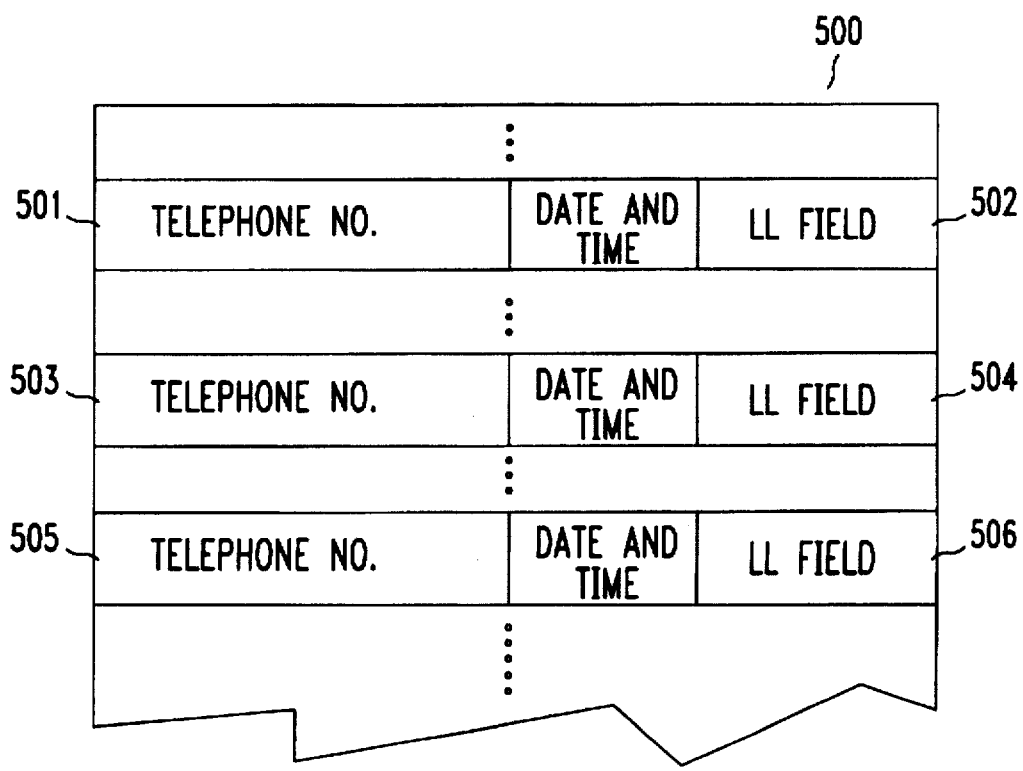
FIG. 4 is an illustrative example of a linked-list of telephone numbers that an adjunct constructs for a subscriber in accordance with an illustrative embodiment of the invention.

An example of such a list is shown in FIG. 4, in which list 500 is stored in database 303. Specifically, assuming that entry 501 is the first record in the list, then the address of the memory location containing that record is stored in field 404 of the associated subscriber record. It is seen that a record in list 500 contains a number of fields for the storage of a telephone number of a station set that tried to reach the subscriber while the subscriber's station set was busy with another telephone call, and the date and time of that telephone call. It also contains a field 502 for storing the address of a next record 503 containing the telephone number and date and time of a next telephone call that tried to reach the associated subscriber's station set when the latter was busy. Similarly, field 504 of the latter record contains the address (i.e., "points to") of a record containing similar data but relating to a different calling station. If a fourth call was placed to the subscriber's station set during a busy condition, then field 506 of record 505 would point to a record in list 500 identifying the fourth call. Otherwise, field 506 contains an address pointing to record 501.

Figure 5:
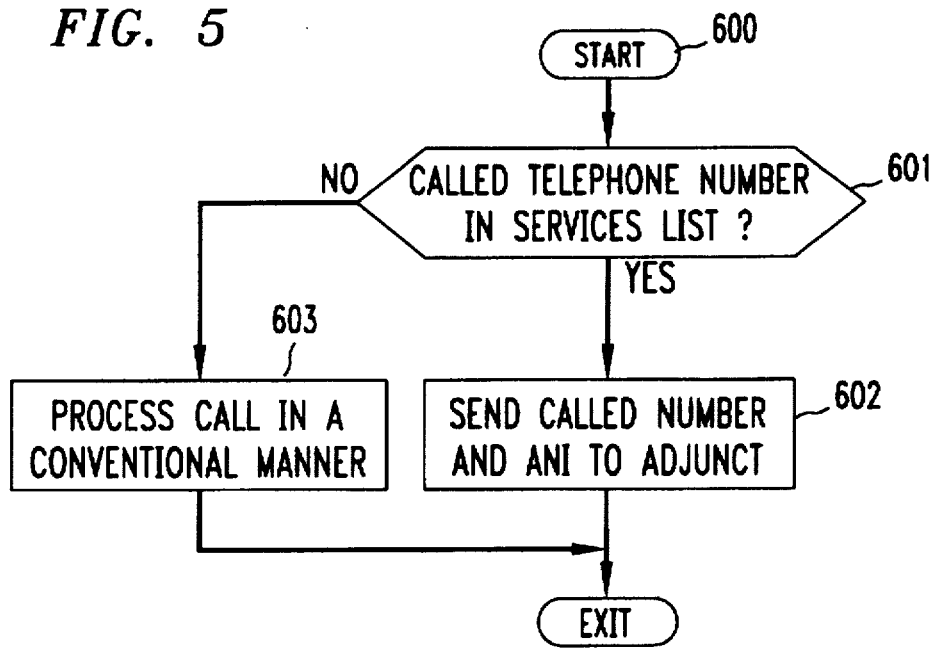
FIGS. 5–8 illustrate in flow chart form the various programs that implement the principles of the invention within the various facilities of the network of FIG. 1.

When an incoming call arrives at a toll switch, e.g., TS 205, via the intertoll network, the main processing program of the toll switch enters the program of FIG. 5. When it is entered (block 600), the program (block 601) checks to see if the called telephone number is contained in its destination list. If it is, then the program (block 602) forwards the information associated with the call, e.g., called number and ANI, to its associated adjunct, e.g., adjunct 305, as discussed above. The program then exits. If the called number is not in the destination list, then the program (block 603) passes the call to its main call processing program, which forwards the call to its intended destination, as discussed above.

Figure 6:
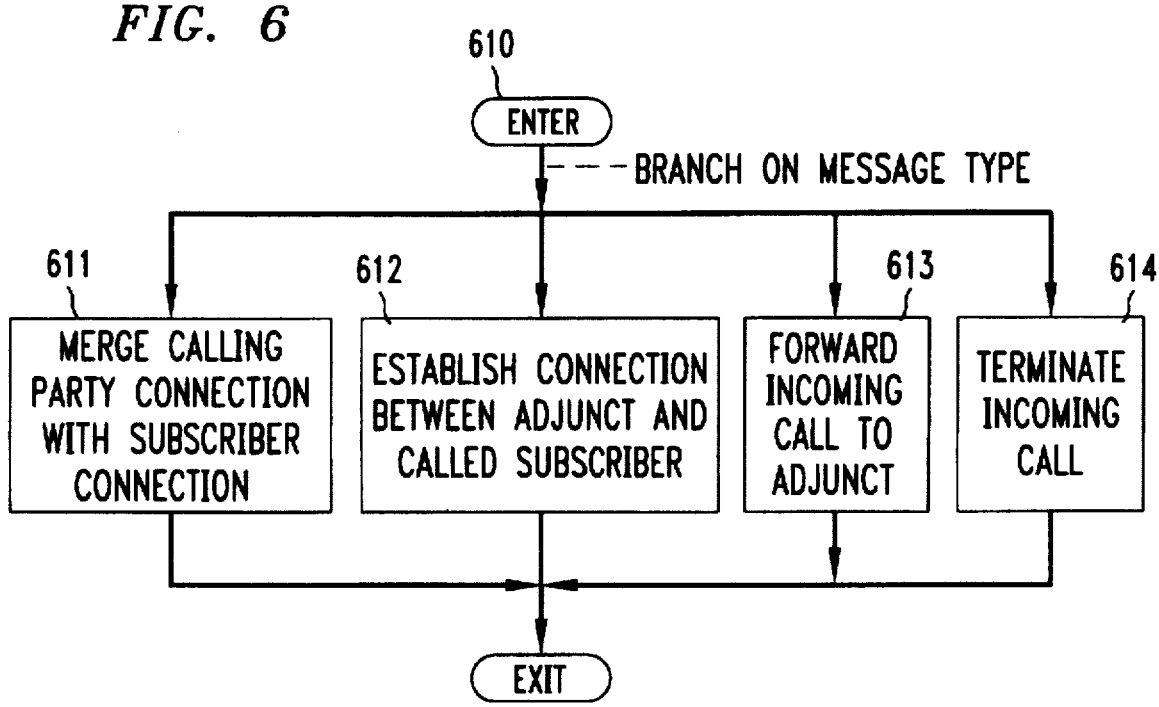

When the toll switch receives a message from the adjunct, then the main processing program of the toll switch enters the program of FIG. 6. When entered (block 610), the program branches to one of a number of different software routines represented by blocks 611 through 614 based on the type of message received from the adjunct. As discussed above, the message could be a request to (a) merge (block 611), (b) establish a connection between the adjunct and called party (block 612), (c) forward the incoming call to the adjunct (block 613) or (d) terminate the call (block 614).

Figure 7:
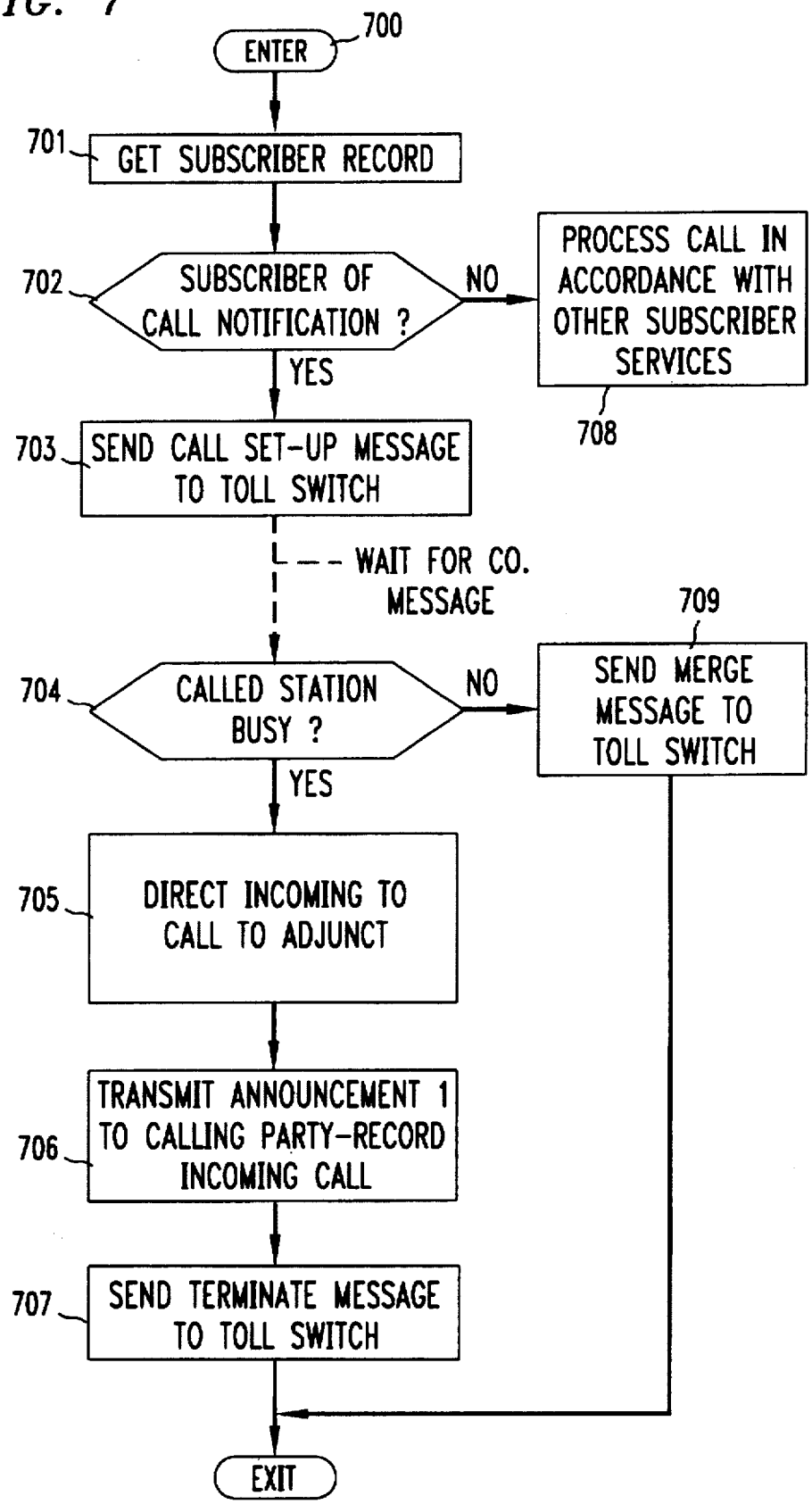

When an adjunct receives an initial message containing a called number from its associated toll switch, the adjunct enters the program shown in FIG. 7. When entered (block 700), and as discussed above, the program obtains a copy of the associated subscriber record from its associated database (block 701). The program (block 702) then checks the record to see if the called subscriber subscribes to the inventive call notification feature. If that is not the case, then the program passes the record to the software module (represented by block 708) that is designed to process the subscriber's subscription of other services. Otherwise, the program (block 703) sends a call set-up (connect) message to its associated toll switch directing the latter to connect the adjunct to the called station. The program then waits to see if it receives an indication that called station is busy from the CO handling the call. If the program (block 704) does not receive such an indication but receives an indication that the CO is ringing the called station, then the program (block 709) sends a merge message to its associated toll switch. Otherwise, the program (block 705) sends a message to the toll switch requesting that the incoming call be connected to the adjunct. When the toll switch completes that task, then the program (block 706) transmits announcement 1 to the calling party and, in the manner discussed above, establishes a record of the call in table 500. The program also enters the called number in a processing list if the called number is not already contained therein. The purpose of the processing list will be discussed below. The program (block 707) then sends a terminate message to its associated toll switch to terminate the connections extending to the calling and called parties. The program then exits.

Figure 8:
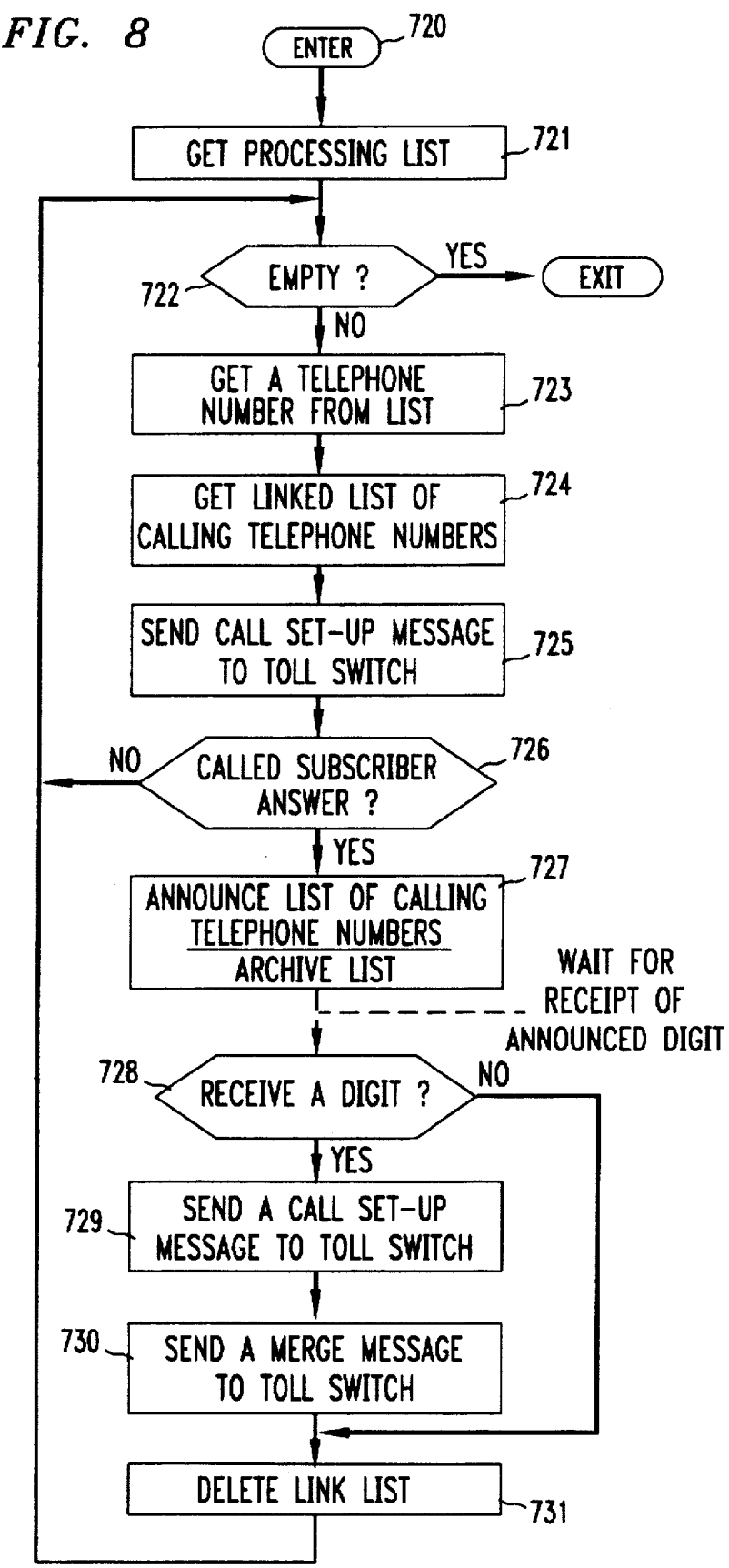

Periodically, e.g., every ten minutes, the adjunct enters the program of FIG. 8 to process table 500. Specifically, when entered, the program (block 721) gets a copy of the processing list which tracks the initial entry that is made in table 500 for a subscriber. Armed with the processing list, the program (block 722) checks to see if the list is empty. If it is, then the program exits. Otherwise, the program (block 723) gets a subscriber telephone number from the list and then gets (block 724) the table 500 linked list of associated calling party records. The program (block 725) then sends a call set-up message to its associated toll switch requesting the switch to place a call to the telephone number that is currently being processed. If the call is answered (block 726), then the program (block 727) announces the list in the manner discussed above in conjunction with announcement 2. The program then waits for the subscriber to enter a digit corresponding with one of the announced linked-list entries. If the program (block 728) receives such a digit, then the program (block 729) sends to its associated toll switch a call set-up (connect) message containing the telephone number stored in the corresponding linked-list entry. The program (block 730) then sends a merge message to its associated toll switch. The program (block 731) then erases the subscriber's telephone number from the process list and, in a conventional manner, deletes the associated linked list from the database. However, before making such a deletion, the program stores the linked list in a so-called archive memory so that the associated subscriber may access the list at a later time. The program then returns to block 702 to process the next subscriber telephone number contained in the process list.

If the program (block 726) finds that the subscriber does not answer the aforementioned telephone call, then the program marks the associated process-list entry for processing during the next entry of the program.

The foregoing is merely illustrative of the principles of the invention. Those skilled in the art will be able to devise numerous arrangements, which, although not explicitly shown or described herein, nevertheless embody those principles that are within the spirit and scope of the invention. For example, announcement (1) and associated adjunct actions may be modified so that the adjunct presents an option of storing the caller's telephone number for presentation to the called subscriber only if the calling party consents thereto. That is, if the calling party consents thereto by entering a particular code, e.g., the pound (#) sign, via the station keypad, then the caller's telephone number is stored in the adjunct database for later presentation to the subscriber. If the calling party rejects the option, then the caller's telephone number is not stored in the adjunct database. In an alternative embodiment of the invention, a toll switch, e.g., TS 205, may be arranged so that it consults the aforementioned destination table only when the called station is busy. Specifically, in the example described above, TS 205 would forward the station S3 call directly to CO 105. When CO 105 notifies TS 205 that station S1 is busy, then TS 205 consults its destination table to determine if the calling information should be supplied to adjunct 305.

We claim:

1. A method of processing a telephone call placed from a calling station to a called station via a public telecommunications network, said calling station being associated with a particular telephone number and said called station being associated with a call notification service as a result of having subscribed to that service, said call notification service being provided by said telecommunications network, said method comprising the steps of responsive to said called station being idle, forwarding said call to said called station, and responsive to said called station being busy, then, independent of any input from a calling party at said calling station, terminating said telephone call at a terminating switch within said network and responsive to said called station being associated with said call notification service, thereafter automatically placing a call from said call notification service via said network to said called station and presenting at least said calling telephone number to a user of said called station.

2. The method of claim 1 wherein said step of terminating includes the step of announcing that said called station is busy to said calling party prior to terminating said call.

3. The method of claim 1 wherein said step of terminating and placing includes the steps of presenting to said user the option of placing a call to said calling station, and responsive to said user invoking said option, placing a call to said calling station.

4. A method of processing a telephone call from a calling station to a called station, said calling station being associated with a particular telephone number, said called station being a subscriber of a call notification service that is invoked when said called station is busy, said method comprising the steps of determining if said called station is busy, responsive to said called station being busy and responsive to said called station being a subscriber of said call notification service, then, independent of any input from a calling party at said calling station, terminating said telephone call at a terminating switch within a telecommunications network, and thereafter placing a call from said call notification service to said called telephone station and announcing at least said calling telephone number to a user of said called telephone station, wherein said call notification service is disposed in said telecommunications network operable for establishing a connection between said calling and called stations.

5. The method of claim 4 wherein said step of terminating includes the step of announcing that said called station is busy to said calling party prior to terminating said call.

6. The method of claim 4 wherein said step of terminating and placing includes the steps of presenting to said user the option of placing a call to said calling station, and responsive to said user invoking said option, placing a call to said calling station.

7. The method of claim 4 wherein said step of announcing includes the step of announcing the date and time of said telephone call from said calling station.

8. A method of processing a telephone call from a calling telephone station to a called telephone station, said calling telephone station being associated with a particular telephone number, said method comprising the steps of receiving said telephone call at a communications switch within a telecommunications network and determining if said called telephone station is busy, if said called telephone station is not busy, then connecting said calling telephone station to said called telephone station, if said called telephone station is busy and is a subscriber of a call notification service provided by said communications switch, then, independent of any input from a calling party at said calling telephone station, storing said calling telephone number and at least the time of said telephone call in memory and terminating said telephone call at said communications switch, and thereafter, placing a telephone call from said call notification service to said called telephone station and announcing at least said stored calling telephone number to a user associated with said called telephone station.

9. The method of claim 8 wherein said step of terminating includes the step of announcing that said called station is busy to said calling party prior to terminating said call.

10. The method of claim 8 wherein said step of placing and announcing includes the steps of presenting to said user the option of placing a call to said calling station, and responsive to said user invoking said option, placing a call to said calling station.

11. The method of claim 8 wherein said step of placing and announcing includes the step announcing the date and time of said telephone call from said calling station.

* * * * *